(12) United States Patent
Petrovic et al.

(10) Patent No.: US 10,298,413 B2
(45) Date of Patent: May 21, 2019

(54) DEVICE AND METHOD FOR AUTOMATIC NETWORK DETECTION AND FORMATION

(71) Applicant: ENTROPIC COMMUNICATIONS, LLC, Carlsbad, CA (US)

(72) Inventors: Branislav Petrovic, La Jolla, CA (US); Yoav Hebron, San Diego, CA (US); Sagar Jogadhenu, San Diego, CA (US); Michail Tsatsanis, Huntington Beach, CA (US); Mark O'Leary, San Diego, CA (US); Yunhong Li, San Diego, CA (US); Inderjit Singh, San Diego, CA (US); Ronald B. Lee, San Diego, CA (US)

(73) Assignee: Entropic Communications LLC, Carlsbad, CA (US)

( * ) Notice: Subject to any disclaimer, the term of this patent is extended or adjusted under 35 U.S.C. 154(b) by 124 days.

(21) Appl. No.: 15/037,931

(22) PCT Filed: Nov. 20, 2014

(86) PCT No.: PCT/US2014/066666
§ 371 (c)(1),
(2) Date: May 19, 2016

(87) PCT Pub. No.: WO2015/077478
PCT Pub. Date: May 28, 2015

(65) Prior Publication Data
US 2016/0294576 A1  Oct. 6, 2016

Related U.S. Application Data

(60) Provisional application No. 62/008,917, filed on Jun. 6, 2014, provisional application No. 62/001,252, filed
(Continued)

(51) Int. Cl.
*G06F 1/26* (2006.01)
*H04L 1/24* (2006.01)
(Continued)

(52) U.S. Cl.
CPC .......... *H04L 12/2861* (2013.01); *G06F 1/266* (2013.01); *G06F 1/3206* (2013.01);
(Continued)

(58) Field of Classification Search
CPC .......... H04H 20/63; H04W 48/16; H03J 7/18
See application file for complete search history.

(56) References Cited

U.S. PATENT DOCUMENTS 7,633,946 B2 * 12/2009 Pavon .................. H04L 47/10
370/395.4
8,428,079 B1 * 4/2013 Lambert ............... H04W 8/005
370/461
(Continued)

OTHER PUBLICATIONS

International Search Report and Written Opinion corresponding to International Patent Application No. PCT/US2014/066666, dated Jan. 23, 2015.
(Continued)

*Primary Examiner* — Melanie Jagannathan
(74) *Attorney, Agent, or Firm* — McAndrews, Held & Malloy, Ltd.

(57) ABSTRACT

A communication device includes a communication port including network interface circuitry; and a processor, and a non-transitory storage medium configured to store program instructions which, when executed by the processor cause the communication device to perform a network operation comprising: entering into a listening phase; and searching for and attempting to acquire a network.

15 Claims, 9 Drawing Sheets

Related U.S. Application Data on May 21, 2014, provisional application No. 61/993,938, filed on May 15, 2014, provisional application No. 61/906,579, filed on Nov. 20, 2013.

(51) Int. Cl.

| | |
|---|---|
| *H04L 12/10* | (2006.01) |
| *H04L 12/12* | (2006.01) |
| *H04L 12/24* | (2006.01) |
| *H04L 12/26* | (2006.01) |
| *H04L 12/28* | (2006.01) |
| *H04N 21/61* | (2011.01) |
| *G06F 1/3206* | (2019.01) |
| *G06F 1/3209* | (2019.01) |
| *G06F 1/3287* | (2019.01) |
| *G06F 1/3296* | (2019.01) |

(52) U.S. Cl.
CPC .......... *G06F 1/3209* (2013.01); *G06F 1/3287* (2013.01); *G06F 1/3296* (2013.01); *H04L 1/24* (2013.01); *H04L 12/10* (2013.01); *H04L 12/12* (2013.01); *H04L 12/2801* (2013.01); *H04L 41/0833* (2013.01); *H04L 41/12* (2013.01); *H04L 43/0811* (2013.01); *H04L 43/50* (2013.01); *H04N 21/6118* (2013.01); *H04N 21/6168* (2013.01); *Y02D 10/171* (2018.01); *Y02D 50/20* (2018.01); *Y02D 50/40* (2018.01); *Y02D 50/42* (2018.01)

(56) References Cited

U.S. PATENT DOCUMENTS

| | | | | |
|---|---|---|---|---|
| 8,725,142 | B1* | 5/2014 | Schmalz | H04W 48/16 370/328 |
| 9,204,409 | B2* | 12/2015 | Bhatia | H04W 56/003 |
| 2003/0039221 | A1 | 2/2003 | Yamada | |
| 2008/0136663 | A1* | 6/2008 | Courtney | H05B 37/0272 340/4.3 |
| 2010/0142396 | A1* | 6/2010 | Kim | H04W 16/14 370/252 |
| 2010/0146616 | A1 | 6/2010 | Garrett et al. | |
| 2011/0075642 | A1* | 3/2011 | Cordeiro | H04W 74/0816 370/338 |
| 2013/0039221 | A1* | 2/2013 | Lee | H04H 20/63 370/255 |

OTHER PUBLICATIONS

PCT, Notification Concerning Transmittal of International Preliminary Report on Patentability, Application No. PCT/US2014/066666 dated Jun. 2, 2016 (8 pages).

* cited by examiner

DEVICE AND METHOD FOR AUTOMATIC NETWORK DETECTION AND FORMATION

CROSS-REFERENCE TO RELATED APPLICATIONS/INCORPORATION BY REFERENCE

This application is a 371 of International Patent Application No. PC/PUS2014/066666, filed Nov. 20, 2014, entitled "DEVICE AND METHOD FOR AUTOMATIC NETWORK. DETECTION AND FORMATION", which claims priority to: U.S. Provisional Patent Application No. 61/906,579, filed Nov. 20, 2013; U.S. Provisional Patent Application No. 61/993,938, filed May 15, 2014; U.S. Provisional Patent Application No. 62/001,252, filed May 21, 2014; and U.S. Provisional Patent Application No. 62/008,917 filed Jun. 6. 2014. The above-identified applications are hereby incorporated herein by reference in their entirety,

TECHNICAL FIELD

The disclosed technology relates generally to communication systems, and more particularly, some embodiments relate to automatic network detection and formation systems and methods for automatic power management.

DESCRIPTION OF THE RELATED ART

Energy consumption of devices continues to be an increasing concern in the electronics industry. This is true the commercial, consumer and military/DOD sectors. Accordingly, electronic devices are being designed to consume less power through the use of energy demand components and automated power management (e.g., automated unit shut down and restart).

It is common place today for electronic devices to communicate with one another. One common way in which devices communicate is by forming a network that includes two or more devices. Devices within a network are commonly referred to as nodes of the network. There are several ways that devices can be organized to form a network. One such way is to form a MoCA network specified by the well-known industry standard called "MoCA" administered by the Multimedia over Coax Alliance. Such MoCA networks are commonly established over the coaxial cables that are typically used within homes and offices to distribute television signals, such as cable television signals, satellite television signals or direct broadcast video-terrestrial (DBV-T) signals. It is common today for homes and offices to be wired with coaxial cable having connectors conveniently located throughout the home or office. Each such connector allows a device to connect directly to each other device in the home or office that is connected to the coaxial cable wiring.

MoCA networks allow devices to communicate with one another at high speed over coaxial cabling using transmissions that are modulated at designated frequencies. In accordance with MoCA, a device that would like to become part of a MoCA network, first listens on each of the plurality of designated MoCA frequencies (i.e., attempts to receive signals transmitted by another node of a preexisting MoCA network). The designated frequencies are commonly referred to as MoCA channels. MoCA capable devices typically can only listen to one channel at a time. Upon beginning the process of attempting to join a MoCA network, the device will listen a predetermined time to each MoCA channel one at a time in an attempt to receive a beacon signal.

A beacon signal is defined by MoCA as a signal transmitted by a particular MoCA network node, referred to as the network coordinator (NC). The beacon is designed to be easy for a new node attempting to join an existing MoCA network to acquire. The beacon is transmitted at regular intervals by the NC. Therefore, if a MoCA network already exists on the coaxial cable to which a new device is connected, the new device will be able to acquire the beacon when it initially listens to the MoCA channels.

It no MoCA network yet exists on the coaxial cable to which the new device is connected, then the new device will start sending out beacons of its own in an attempt to form a new MoCA network. The new network will be formed by the new device and any other device that is also seeking to join a MoCA network on the same coaxial cable.

When a MoCA node initially powers up, the node will typically start sending beacons over the last operating frequency (LOF) used by that device. The LOF is the MoCA channel that the device used last to communicate with other MoCA devices over a MoCA network.

MoCA designates the timing used by a MoCA network to send these beacons in an attempt to acquire or form a new network. This timing requires that a new node attempting to join a MoCA network listen for 40 seconds to each of the possible MoCA channels to determine whether a MoCA network already exists. The new node will listen to each channel one at a time for 1.05 seconds and then tune to the next channel.

Typically, the node will listen to LOF first and then search the channel with the lowest frequency. The node will then search the LOF again. The node will then step up in frequency one channel. The node then returns to listen again to the LOF. This pattern of bouncing between the LOF and the next higher channel will continue until reaching the channel with the highest frequency. This pattern is then repeated in descending order from the channel with the highest frequency to the channel with the lowest frequency with LOF searched in between each other channel. This process of stepping up and down one channel at a time continues for the 40 second listening phase.

After 40 seconds, if no beacons are found, the new node will determine that there is no existing network. Accordingly, the new node will take the role of NC in an attempt to form a new MoCA network. Accordingly, the new node will execute at least 100 "Beacon Phase Cycles" (BPCs). Each BPC consists of a period having a duration randomly selected from the range of 0.1 to 1 second during which the new node listens to one of the MoCA channels, followed by 50 beacon cycles. The beacon transmissions sent during the beacon cycles are sent on the same MoCA channel (i.e., the LOF) with the assumption being that another new node that attempts to join the network will search each of the possible channels during its 40 second initial listening period and hear the beacons that the beaconing node is transmitting.

Each beacon cycle is 10 milliseconds long and includes a short burst transmission of the beacon followed by an admission control frame (ACF). The ACF is a period of time during which the new node will listen to hear whether another node has acquired the beacon previously sent. The 50 beacon cycles are followed by another period that randomly varies from 0.1 second to 1.05 seconds during which the new node will listen to the LOF MoCA channel in an attempt to form a MoCA network on the LOF channel. The combination of the 50 beacon cycles followed by the 0.1 to 1.05 second listening period constitute one BPC. A node that is has not yet formed a network will execute 100 such BPCs and then enter a listening phase for another 40 seconds during which the node will search each of the possible channels to see whether a new network has been formed on one of those other channels.

This process is repeated until a new network is either formed or found. However, a problem arises when two or more devices attempt to join a MoCA network at essentially the same time, each having a different LOF. That is, if two or more MoCA enabled devices connected to the same coaxial cable are powered up together, each will listen for a beacon for 40 seconds. Since neither is yet sending any beacons, neither will know of the existence of the other. At the end of the 40 seconds, each will time out without acquiring a network beacon. Therefore, they will each start sending beacons on their respective LOF. This is not a problem if the two nodes had the same LOF, since they will eventually hear each other. However, if the two nodes have different LOFs, then they will not hear each other. At the end of the 100 BPCs, each node will enter the 40 second listening phase. However, since the amount of time during which each is executing the BPCs is essentially statistically the same, they will both start listening at essentially the same time and the chances of one hearing the other are very low. That is, the listening period within each BPC is randomly determined to be between 0.1 and 1.0 seconds. Therefore, it is possible for there to be a different in the total amount of time it takes each node to execute 100 BPCs. However, since the duration of each BPC is random, the average amount of time over the 100 BPCs, statistically, will be very close to equal. Therefore, the two nodes will be synchronized and miss each other for several hours before the synchronization of the two nodes is sufficient disrupted to allow one to be transmitting beacons while the other is listening on the LOF of the other. This is typically not a significant problem, but for the fact that each MoCA node that is searching for a MoCA network consumes a significant amount of power.

BRIEF SUMMARY OF EMBODIMENTS

According to various embodiments of the disclosed technology automatic network detection and formation can be provided. In some embodiments, a communication device, may include: a housing; a communication port including network interface circuitry; and a processor within the housing, and a non-transitory storage medium configured to store program instructions which, when executed by the processor, cause the communication device to perform a network operation comprising: enter into a listening phase; and search for and attempt to acquire a network.

The listening phase may be configured to last for a predetermined period of time, wherein the predetermined time may be a time that is long enough to search for and acquire a network beacon for a given network MAC protocol.

Acquiring a network beacon may include acquiring a beacon transmitted by a network coordinator of a communication network.

The search operation may be initiated on the last operating frequency used by the communication device to communicate over a communication network. The search operation may further include stepping through the channels available for the communication device and conducting communications in accordance with the network protocol. The search operation may be initiated on the last operating frequency (LOF) used by the communication device to communicate over a communication network and the communication device may be configured to step through the channels one at a time, for example, starting from the LOF.

The search operation may be initiated on the last operating frequency (LOF) used by the communication device to communicate over a communication network; and the search operation continues by searching the channels one at a time from the lowest frequency to the highest frequency and returning to search the LOL between each search of the individual frequencies from the lowest frequency to the highest frequency.

The network operation may further include initiating a beacon phase if the communication device does not find a network during the search operation. The beacon phase may include transmitting beacons over the network and listening for beacons that may be transmitted by another node. The beacon phase may further include repeating the listening phase if a beacon from a network node is not received by the communication device during the beacon phase. The beacon phase may also include listening for a response from a network node to the beacons transmitted by the communication device. The listening phase may be repeated if a response to a beacon is not received by the communication device during the beacon phase.

The listening phase may be conducted for an amount of time that is required to search each channel at least once. The listening phase may be any duration, but in one embodiment is configured to be of a duration varying between 0.1 seconds and 1 second.

In yet another embodiment, a method of network formation performed by communication device, includes: the communication device entering a listening phase during which the communication device listens on a predetermined channel to determine whether a network has been formed; and if the communication device does not detect a network during the listening phase, the communication device entering a beacon phase during which the communication device transmits beacons of a type compatible with a network protocol and listens for either beacons from another network node or a response to the beacons transmitted by the communication device.

In some embodiments if a beacon or a response to a beacon transmitted by the communication device is not received by the communication device during the beacon phase, the communication device may be configured to return to the listening phase.

The listening phase may be configured to last for a predetermined period of time, wherein the predetermined time is a time that is long enough to search for and acquire a beacon for a given network MAC protocol. The listening phase may be initiated on the last operating frequency used by the communication device to communicate over a communication network. The listening phase may include stepping through the channels available for the communication device and conducting communications in accordance with the network protocol.

The listening phase may be initiated on the last operating frequency (LOF) used by the communication device to communicate over a communication network and the communication device steps through the channels one at a time starting from the LOF. In further embodiments, the listening phase may be initiated on the last operating frequency (LOF) used by the communication device to communicate over a communication network; and the search operation continues by searching the channels one at a time from the lowest frequency to the highest frequency and returning to search the LOL between each search of the individual frequencies from the lowest frequency to the highest frequency.

The listening phase may be conducted for an amount of time that is required to search each channel at least once. Although any duration can be selected depending on the application, in one embodiment the listening phase is of a duration varying between 0.1 seconds and 1 second.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing power management for communication devices based on the status of a device's connection. More particularly, the various embodiments of the technology disclosed herein relate to power management based on the presence or absence of a physical connection to the device, or based on the presence or absence of a network attached to the device. Further embodiments are related toward automatic network detection and formation.

Figure 1:
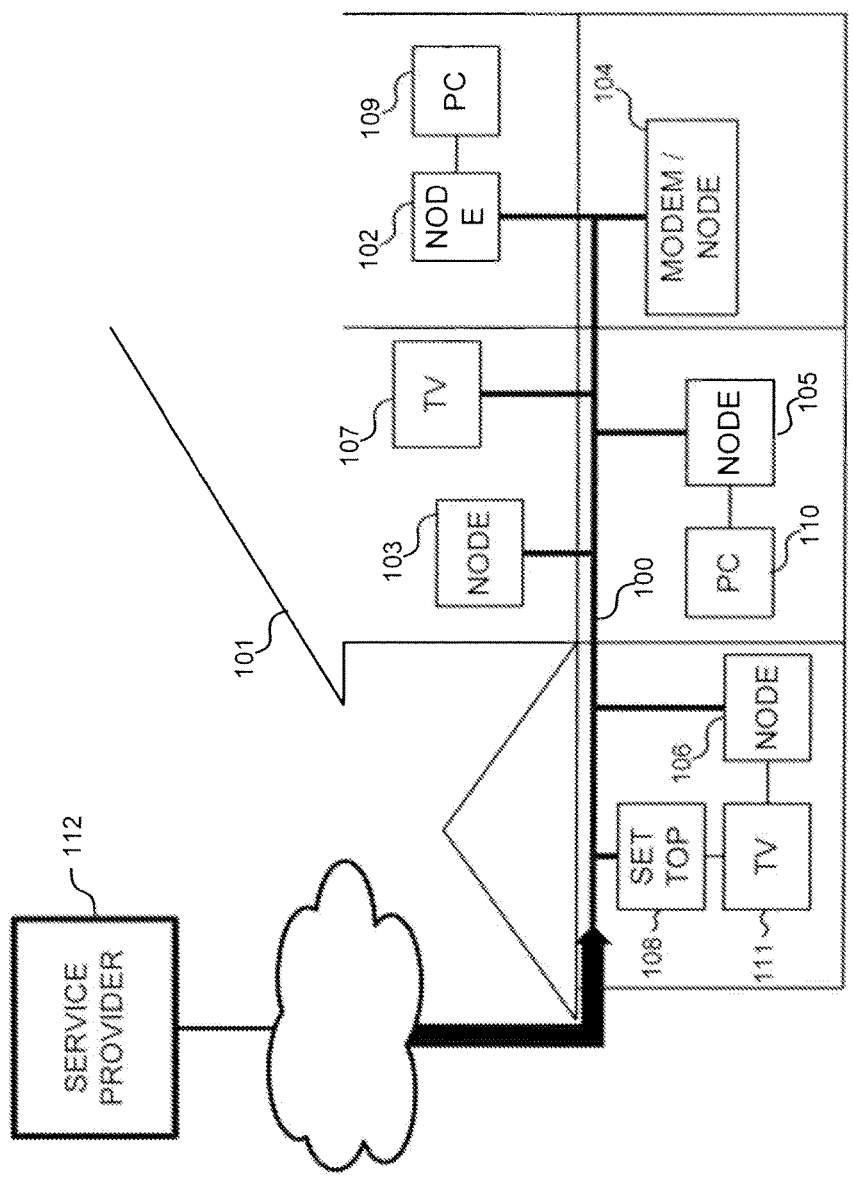
FIG. 1 is a diagram illustrating an example of a multimedia network with which various embodiments of the technology disclosed herein may be implemented.

Before describing the disclosed systems and methods in detail, it is useful to describe an example of an environment in which the disclosed technology can be implemented. The example network of FIG. 1 is now described for this purpose. The network of FIG. 1 is one example of a multimedia network implemented in a home or office. In this example, a wired communications medium 100 is shown. The wired communications medium might be a coaxial cable system, a power line system, a fiber optic cable system, an Ethernet cable system, or other similar communications medium. Alternatively, the communications medium might be a wireless transmission system. As one example of a wired communication medium, with a Multimedia over Coax Alliance (MoCA®) network, the communications medium 100 is coaxial cabling deployed within a residence 101 or other environment. The systems and methods described herein are often discussed in terms of this example coaxial network application, however, after reading this description, one of ordinary skill in the art will understand how these systems and methods can be implemented in alternative network applications as well as in environments other than the home.

The example network of FIG. 1 comprises a plurality of network nodes 102, 103, 104, 105, 106 in communication according to a communications protocol. For example, the communications protocol might conform to a networking standard, such as the well-known MoCA standard. Nodes in such a network can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from one or more other network nodes. A node might also be associated with a speaker or other media playing devices that plays music. A node might also be associated with a module configured to interface with an internet or cable service provider 112, for example to provide Internet access, digital video recording capabilities, media streaming functions, network management services the residence 101. Also, televisions 107, set-top boxes 108 and devices may be configured to include sufficient functionality integrated therein to communicate directly with the network.

With the many continued advancements in communications technology, c and more devices are being introduced in both the consumer and commercial sectors advanced communications capabilities. Many of these devices are equipped with communication modules that can communicate over the wired network (e.g., over a MoCA Coaxial Network) as well as modules that can communicate over fiber or other networks as well. Indeed, in many environments, it is becoming more commonplace for there to be multiple networks, and sometimes multiple different networks, across which a user may wish the network devices to communicate. In such circumstances, network bridges can be used to allow devices to communicate across multiple networks.

Having thus described an example environment in which the disclosed technology can be implemented, various features and embodiments of the disclosed technology are now described in further detail. Description may be provided in terms of this example environment for ease of discussion and understanding. After reading the description herein, it will become apparent to one of ordinary skill in the art that the disclosed technology can be implemented in any of a number of different communication environments (including wired or wireless communication environments) operating with any of a number of different electronic devices, whether or not according to various similar or alternative protocols or specifications.

Figure 2:
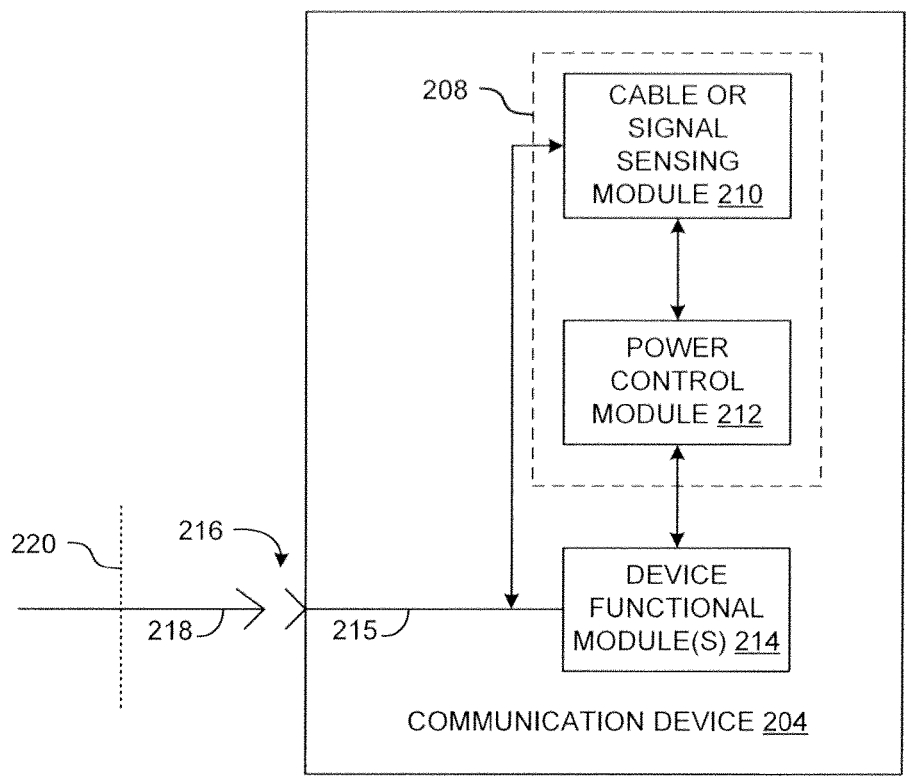
FIG. 2 is a diagram illustrating an example architecture for a communication module having power management capabilities in accordance with one embodiment or the technology disclosed herein.

As noted above, some embodiments of the technology disclosed herein may be implemented to conduct power management operations based on the presence or absence of a communication cable connected to the subject equipment. FIG. 2 is a diagram illustrating an example architecture for a communication module having power management capabilities in accordance with one embodiment of the technology disclosed herein. In the example illustrated in FIG. 2, the communication device 204 includes power management module 208 and device functional modules 214. Power management module 208 includes a sensing module 210 and a power control module 212. Sensing module 210 can include the capability detect the presence or absence of a cable connected to the communication device 204. In other embodiments, sensing module 210 can include the capability to detect the presence or absence of a signal on incoming signal path.

Device functional modules 214 can include, for example, one or more electronic components (with or without associated software) used by communication device 204 in its intended operation. For example, where communication device 204 is a set-top box, device functional modules 214 can include, for example, a communications transceiver, including a transmitter and receiver to transmit and receive data (e.g., MoCA packets) across a coaxial network, tuners, a display, display drivers, indicators, GUI generators, DVRs, and the like. Communication device 204 is not limited to set-top box applications it can also be applied to adapters, bridges, routers, and other equipment with networking or communications capabilities.

In the illustrated example, communication device 204 includes a port that may include a signal path 215 connected to a connector 216 such as, for example, an F connector or the like. Signal path may include, for example, a conductive wire (whether or not shielded), traces on a printed circuit board, or other electrical connection between connector 216 and the device components. As illustrated, connector 216 may be configured to be connected to a physical communication medium 218 such as, for example, a coaxial cable (e.g., via a mating connector), which in turn may be connected to a all outlet 220. Wall outlet 220 may connect to a coaxial network or backbone such as, for example, communications medium 100 as shown in the example of FIG. 1. As will become apparent to one of ordinary skill in the art after reading this description, the disclosed technology can be implemented with a number of different communication interfaces, and it is not limited to implementation with the exemplary F connector and coaxial cable.

Communication device 204 can further include a housing within which some or all of its components can be mounted (partially or completely). Interface components such as displays, indicators and connectors can be mounted at an exterior surface of the housing so that they can be viewed or accessed easily. A power supply is typically included with the communication device 204. The power supply can include, any of a variety of power sources such as, for example, batteries or capacitor banks (or other energy storage devices), AC/DC power converters (or other power converters or inverters, whether AC-to-DC, AC-to-AC, DC-to-DC or DC-to-AC), generators, photovoltaic cells, and so on. The power supply (whether or not including related voltage dividers, conditioning circuits etc.) can be used to supply power to the various components and modules. Accordingly, the various components and modules may be coupled to draw energy directly or indirectly from the power supply.

Having thus presented an example architecture communication device 204, an example of its operation is now described in terms of this example architecture. In operation, sensing module 210 can be implemented to detect the presence or absence of a cable 218 connected to connector 216. Sensing module 210 may be configured to communicate the result of this detection to power control module 212 example, where sensing module 210 detects the absence of cable 218, it communicates this information to power control module 212.

Upon receipt of this information, power control module may be configured to transition the communication device 204 into a sleep mode. That is power control module 212 can be configured to reduce power of communication device 204 to save energy. In various embodiments, one or more components of communication device 204 can be powered down or transitioned to a low-power state to reduce the overall power consumed by the unit. A low-power state can comprise a state in which the component consumes less power than if it were to remain in its normal operational state. Power control module 212 may be configured to reduce power of the device in accordance with a predetermined methodology. However, in other embodiments, power control module 212 may be configured to determine a number of power-down factors such as, for example, which of a plurality of components to power down, the degree or extent to which such selected components should be powered down, the length of time for which the components should be powered down (or in a reduced-power state) and so on. Such determinations can be made, for example, based on the functions performed by communication device 204, components related to those functions and other factors. As a further example, Energy Star requirements may dictate the extent to which one or more components of the communication device 204 are powered down.

Determinations can also be made based on the amount of time required to return communication device 204 to an operational state upon power up, and the speed with which this must occur based on the communication requirements or specifications of the communication device 204. For example, if communication device 204 is part of a high-priority communication system in which delay or latency cannot be tolerated, components that take an unduly long time to power back up (e.g., longer than the amount of time that would be permitted to allow the communication device 204 to return to operation and meet a given specification) might not be powered down, or might only be partially powered down (so that they don't take as long to return to their operational state). This determination can be preconfigured for a given device or application, or may be determined on a case-by-case basis by the unit depending on the application of the unit, the importance or priority of a given communication flow with which it is operating, and so on.

Power control module 212 may further be configured to limit the amount of time that the unit or portions thereof are in power-down mode. For example, the system may be configured to enter a power-down or sleep mode, yet continue to operate sensing module 210 to continue to sense for a connection. When the connection returns (whether a physical connection, signal, or other indicia of returning service, depending on the embodiment) this can be communicated to power control module 212, which can, in turn, begin to return the device functional modules 214 to the on state. In other embodiments, a timer can be set and configured such that regardless of the absence or presence of the connection, the unit is powered hack up to its fully operational mode (or partially operational in some embodiments, depending on the application) when the predetermined amount of time has elapsed. In further embodiments, sensing module 210 may be configured to sense continuously or regularly upon the initiation of the power-down mode, while in other embodiments, sensing module 210 may be configured to also enter a sleep mode (partially or fully power down) for a predetermined period of time upon detecting the absence of the connection.

In addition to or instead of checking the presence of a cable or other physical connection, embodiments may also be implemented in which sensing module 210 is con figured to detect the presence or absence of a network service on a communication link. For example. sensing module 210 can be configured to look for the absence or presence of a signal at the communications interlace (whether wired or wireless which information can be used to trigger the power-savings mode. Various techniques can be used to detect the absence or presence of a network service, examples of which are described in further detail below.

There are a number of techniques that can be used to determine the presence or absence of a connection in accordance with various embodiments. For example, where sensing module 210 is configured to determine whether a cable is connected to the device, it can be configured to measure signal characteristics on signal path 215 (which may itself indicate whether a cable is connected to the device). As a further example, in one embodiment, the system can be configured to simply detect the presence or absence of a signal on signal path 215. In further embodiments, the system can be configured to check for particular signal characteristics of a signal that may be present on the signal path. That is, in some embodiments, the system can be configured to check for particular network communications (e.g., the presence of network beacons) on signal path 215.

The system may also be configured to launch a probe signal onto signal path 215 and detect and measure the results of that launched signal. Such a probe signal may be launched, for example, by sensing module 210, or by one of the device functional modules 214. Cable presence circuits can be included with sensing module 210 to determine whether the cable is connected or not by, for example, measuring the resulting voltage or current at the port due to the test signal, comparing the measured value with a reference value and, based on the outcome of the comparison, deciding whether an external cable is mated to the device or not. For example, signal characteristics can be measured at the center pin or sensed at a filter connected as part of signal path 215. As a further example, the phase or amplitude, or both, of the signal may be measured to determine whether a cable 218 (and ultimately the network) is connected to connector 216.

In various embodiments, the reference values may be trained by characterization and stored, or the reference values may be configured by design of the unit. For example, the communication device 204 may be characterized during design to establish a characterization of the phase and amplitude of a launched signal for connected and opened configurations.

In some embodiments, the test signal may include a signal that is swept over a frequency range such that measured results can be compared to their corresponding references at various frequencies. For example, the system can be configured to compare the energy at one or more frequencies with reference energy values corresponding to those frequencies to determine whether a cable is present.

In further embodiments, the test signal can be configured to be a low-level signal or of short duration to minimize the potential interference that may be induced on signal path 215 (and potentially onto the network) in the event that the cable is connected. For example, the system may be configured to intermittently launch a short duration signal to detect the presence or absence of a connection, and then wait for a predetermined period of time before launching another signal. It is noted that there may be a trade-off between recovery time and the sampling period. For example, if a fast recovery is needed based on system requirements, the system may be configured to sample or probe more frequently.

Figure 3:
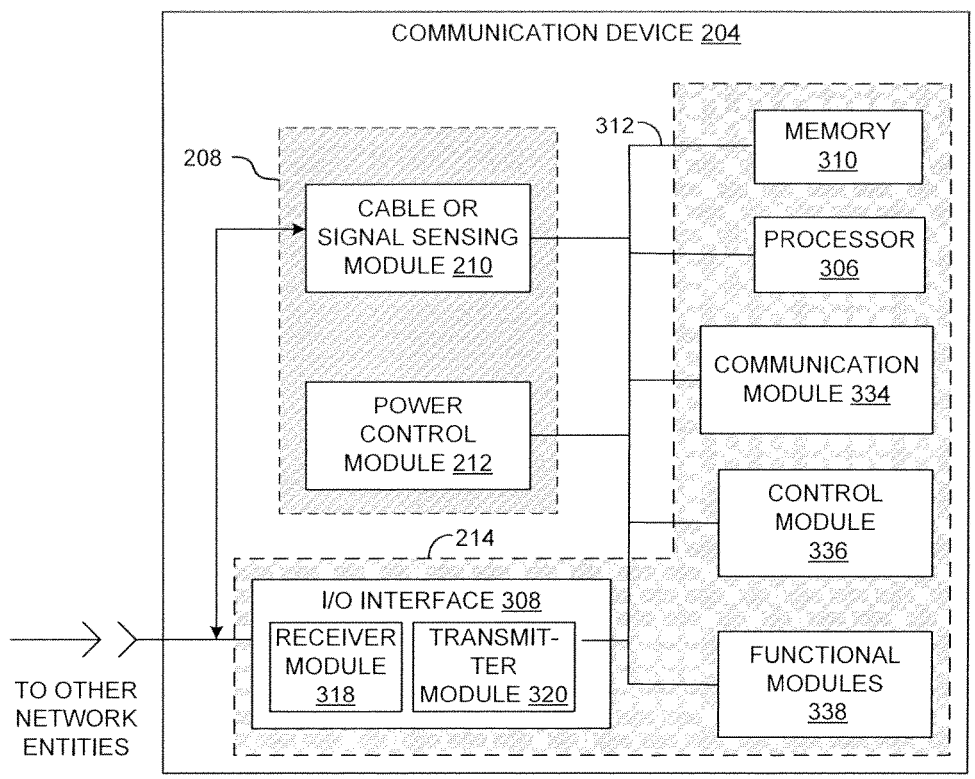
FIG. 3 is a diagram illustrating an example of a communication device with which the technology disclosed herein may be implemented.

FIG. 3 is a diagram illustrating an example of a piece of a communications module with which the technology disclosed herein may be implemented. After reading this description, one of ordinary skill in the art will appreciate that the technology disclosed herein can be used with any of a number of different devices or equipment having communication capabilities.

With reference now to FIG. 3, in this example application, the example communication device 204 includes sensing module 210, power control module 212, and one or more device functional modules 214. In this example, device functional modules 214 include an I/O interface module 308, functional modules 338, a control module 336, and a communication module 334. Communication device 204 also includes a processor 306 (which can include multiple processors or processing units), and memory 310 (which can include memory units or modules of different types). Processor 306 in memory 310 can also be shared by sensing module 210 and power control module 212, or these components include their own processors and memory. The various components of the communication device 204 are communicatively coupled via a bus 312 over which these modules may exchange and share information and other data.

I/O interface module 308, as provided in the illustrated example, can be configured to couple communication device 204 to other network nodes. These can include other network nodes or other equipment. In some embodiments, I/O interface module 308 comprises network interlace circuitry, which in this example architecture includes a receiver module 318 and a transmitter module 320. These can, for example, include a communication receiver and a communication transmit wired or wireless communications across the network. Accordingly, communications via the I/O interface module 308 can, for example, be wired network communications, and the transmit and receiver contained therein can include line drivers and receivers, as may be appropriate for the network communication interfaces. For example, I/O interface module 308 can be configured to interlace with a network such as a MoCA network or an Ethernet network (although other network interfaces can be provided) or with a non-network physical connection. I/O interface module can also be configured to provide a wireless communication interlace (e.g., Bluetooth, Zigbee, IEEE 802.11, and so on) including an antenna or antennas. Transmitter module 320 may be configured to transmit signals that can include data, beaconing and other MAC communications, and other information. These may be sent using a standard network protocol if desired. Receiver module 318 is configured to receive signals from other equipment. These signals can likewise include data and other communications from the other equipment, and can also be received in a standard network protocol if desired.

Memory 310, can be made up of one or more modules of one or more different types of memory, and in the illustrated example is configured to store data and other information 324 as well as operational instructions that may be used by the processor to operate communication device 204. The processor 306, which can be implemented as one or more cores, CPUs, DSPs, or other processor units, for example, is configured to execute instructions or routines and to use the data and information in memory 310 in conjunction with the instructions to control the operation of the communication device 204. For example, in the case of a set-top box program guides or other GUIs can be stored in memory 310 and used in the operation of communication device 204.

Other modules can also be provided with the communication device 204 depending on equipment's intended function or purpose. A complete list of various additional components and modules would be too lengthy to include, however a few examples are illustrative. For example, a separate communication module 334 can also be provided for equipment to manage and control communications received from other entities, and to direct received communications as appropriate. Communication module 334 can be configured to manage communication of various information sent to and received from other entities. Communication module 334 can be configured to manage both wired and wireless communications, A separate control module 336 can be included to control the operation of communication device 204. For example, control module 336 can be configured to implement the futures and functionality of communication device 204. Functional modules 338 can also be included to provide other equipment functionality. For example, in the case of a set-top box, these modules (which may include various forms of hardware and software) can be provided to receive program content, decode received program content, convert the decoded content to an acceptable form for playback, and so on. As these examples illustrate, one of ordinary skill in the art will appreciate how other modules and components can be included with communication device 204 depending on the purpose or objectives of the equipment.

Figure 4:
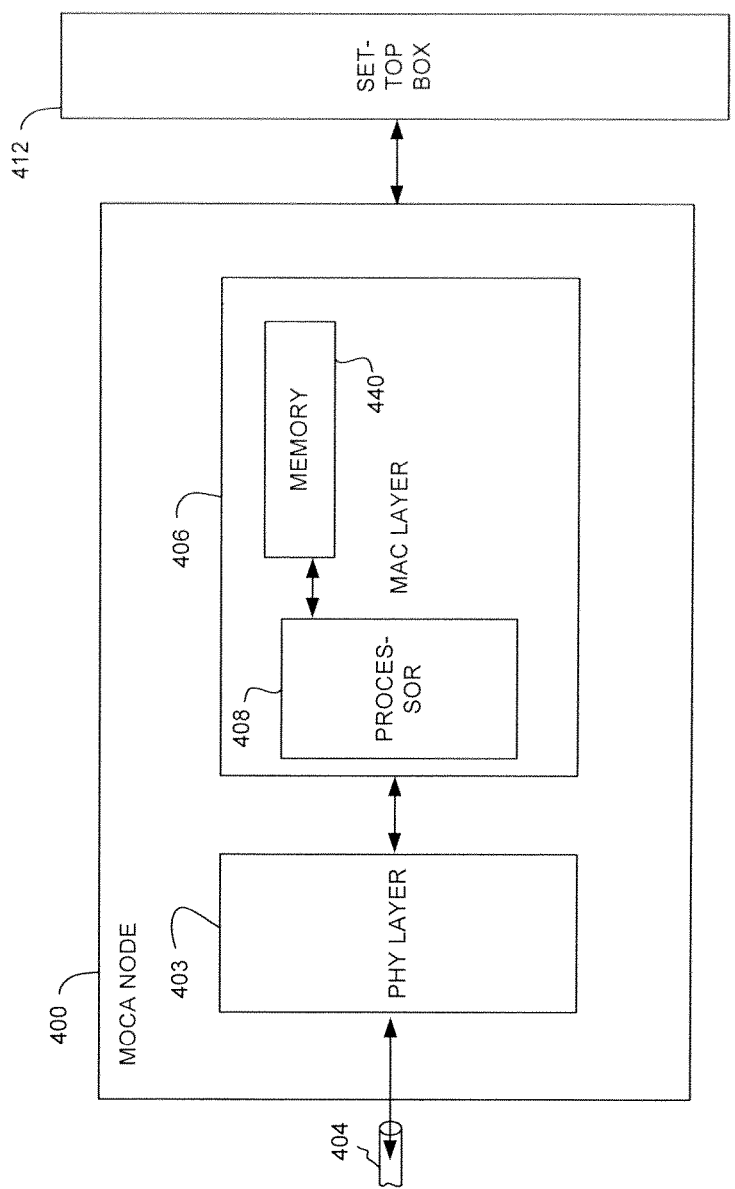
FIG. 4 is a diagram illustrating another example of a communication device in accordance with one embodiment of the technology disclosed herein.

FIG. 4 is a diagram illustrating another example of a communication device in accordance with one embodiment of the technology disclosed herein. The example in FIG. 4 includes a network node 400 connected to a set-top box 412. In the example illustrated in FIG. 4, the node 400 is a MoCA node that includes a physical layer (PITY layer) 403, and a media access control layer (MAC layer) 406. In other embodiments, node 400 can be a network node for other networks including a WiFi network (IEEE 802.11) or other local area or wide area network.

PHY layer 403 can be included with network node 400 to provide communications over a communications medium such as, for example, a coaxial cable 404 (used as the medium for a MoCA network), an Ethernet cable, a wireless interface, and so on. PHY layer 403 can be used to provide modulation and demodulation of signals for transmission over the communications medium. As illustrated PRY layer 403 is communicatively coupled to MAC layer 406. MAC layer 406 can be used to determine the content and timing of transmissions over the communication network (e.g., the MoCA network). In the illustrated example, MAC layer 106 includes a processor 408 and a memory 410. In various embodiments, processor 408 is responsible for performing the functions of MAC layer 406, and communicates with memory 410 to both retrieve instructions of the processor functions, and also to store information necessary to the functions processor 408.

In the illustrated example, node 400 is coupled to a device, such as a set top box 412. The node 400 can be configured to allow the set-top box 412 to communicate with other network nodes such as, for example, other set top boxes, DVR's, computers, and so on, over the network. In other embodiments, node 400 can be included within set-top box 412, or within another network device. Accordingly, MAC layer functionality can be performed by a processor that also performs a set-top box functions. Alternatively, set-top box functions and MAC layer functions can be performed by independent processors. In terms of the example illustrated in FIG. 3, the functionality of both network node 400 and set-top box 412 can be included in communication device 204.

As noted above, the timing and content of the signals are generated and controlled by MAC layer 406. The signals transmitted over the network are generated by the PHY layer 403. One of ordinary skill in the art will typically understand the division of functionality between a PHY layer 403 and in MAC layer 406.

Figure 5:
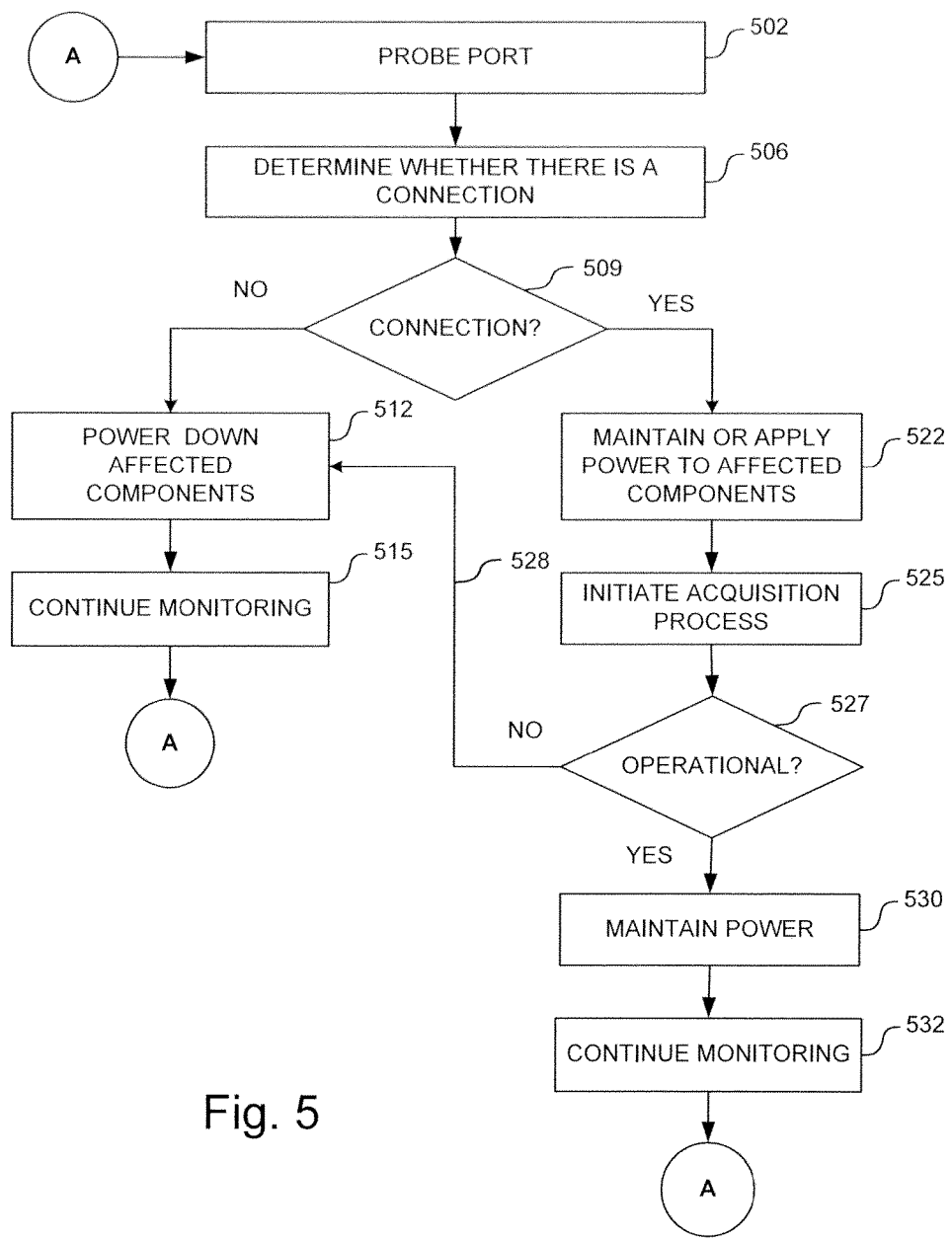
FIG. 5 is an operational flow diagram illustrating an example process for power management based the absence or presence of a connection in accordance with one embodiment of the technology disclosed herein.
Figure 6:
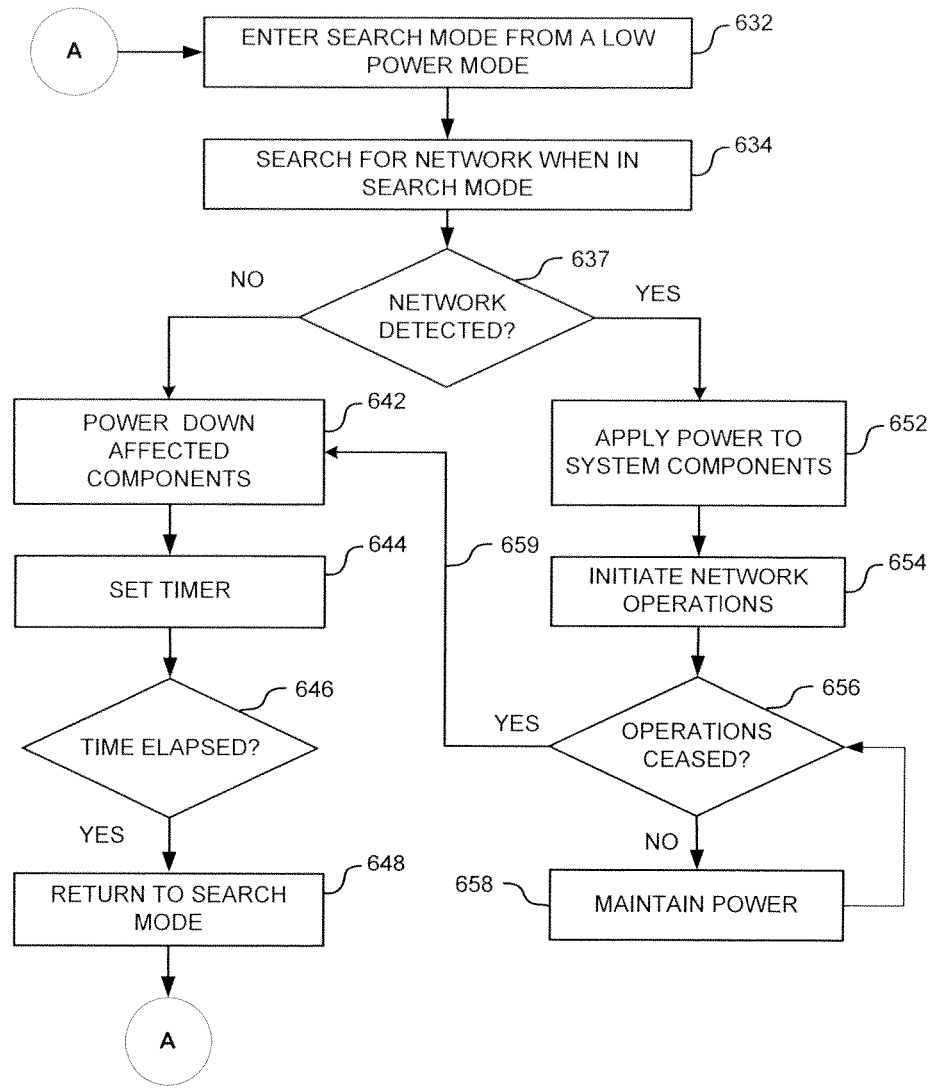
FIG. 6 is an operational flow diagram illustrating another example process for power management based the absence or presence of the connection in accordance with one embodiment of the technology disclosed herein.

As described above, in various embodiments, a communication device (e.g. communication device 204) can be provided with features and functionality to perform power management operations based on the device's connectivity with a network or other communications interface. FIG. 5 is an operational flow diagram illustrating an example process for power management based the absence or presence of a connection in accordance with one embodiment of the technology disclosed herein. FIG. 6 is an operational flow diagram illustrating another example process for power management based the absence or presence of the connection in accordance with one embodiment of the technology disclosed herein. Particularly, the FIG. 5 illustrates an example of managing power based on the absence or presence of port connectivity, while FIG. 6 illustrates an example of managing power based on the absence or presence of a communication network. FIGS. 5 and 6 are now described in terms of the example communication device 204 introduced above. After reading this description, one of ordinary skill in the art will understand how these processes can be implemented with other communication devices.

Referring now to FIG. 5, at operation 502, the device is configured to probe a communication port. For example, sensing module 210 can probe the communication port associated with connector 216 to determine whether a mating connector/cable is connected to connector 216, or to determine whether a signal is present. At operation 506, the device determines whether there is a connection. At this step, the device (e.g., sensing module 210) can be configured in any of a number of different embodiments to determine, for example, whether a cable or network is connected to the port or whether the appropriate s is present at the port.

If there is no connection, and the system is not yet powered down, the system initiates power-down operations to power down, or reduce the power or, selected components. This is illustrated at operations 509 and 512. If the system was already in a powered-down mode, this powered-down mode is maintained at operation 512.

At operation 515 the system can continue monitoring the port to determine whether a connection is established as illustrated by operation 515. The monitoring can be performed on a periodic basis as noted above. At this point, power management components (e.g. sensing module 210 and power control module 212) may remain awake. In other embodiments, power management components (e.g. sensing module 210 and power control module 212) may be powered down along with the functional modules or the communication device. If the presence sensing components (e.g. sensing module 210 of power management module 208) are powered down, at the next probing event they are powered back on for sensing. If during further probing iterations the connection continues to be absent, the device remains in the powered down mode, but can continue periodic monitoring. The sensing modules may be configured to periodically awaken from the sleep mode at least long enough to determine whether an external cable is mated to the connector, or whether the port is otherwise connected. Accordingly, in embodiments where the sensing modules are powered down as well, the sensing modules can be toggled between a sensing mode and a sleep mode to conserve power when not checking the connection.

If the system is currently powered, and the device determines that there is a connection (operations 506, 509), power is maintained. If, on the other hand, the system is in a powered-down mode and the device determines at operation 506 that there is a connection, power is restored to the affected components. This is illustrated by operations 509 and 522. In some embodiments, the operational status of the device can be confirmed to determine whether power should be maintained at the affected components. Accordingly, at operation 525, the device can be configured to initiate an acquisition process or otherwise attempt to connect to the network (or other communication link at the port). If the acquisition is successful or the device is otherwise confirmed operational as illustrated at 527, power is maintained as illustrated at operation 530. The powered device can continue monitoring for connections to determine whether power should be maintained or powered down. This is illustrated by operation 532.

On the other hand, if at operation 527 the acquisition is not successful or the device is not otherwise confirmed operational, the device may be returned to a powered-down mode and monitoring continued. This is illustrated by operational path 528, and operations 512 and 515.

Referring now to FIG. 6, an example method for checking for a connection based on network detection is now described. At operation 632, in this example the device wakes from a sleep mode, or low-power mode and enters a search mode to search for the presence of a network. In the sleep mode or low-power mode, the device may be powered down or in a mode with power consumption reduced or minimized. In the search mode, power is returned to the device so it can search for the presence of a network and one or more communication interlaces. In various embodiments, different levels of power may be applied to the device in the search mode. For example, in some embodiments, only those components necessary for searching e.g. power management module 208 or sensing module 210) are powered on during search mode, while in other embodiments additional components or even the entire device are powered on in the search mode.

At operation 634, while in the search mode, the device searches for the presence of a recognizable network. In some embodiments, this can be done, for example, by a sensing module 210. The device may be configured to search for network signals in general, or it may be configured to search for particular signals or data packets conforming to one or more of a plurality of acceptable network protocols. For example, in some embodiments, the system can be configured to search for particular MAC protocol elements the presence of which would indicate the existence of a network. In terms of a MoCA network, for example, the system can be configured to listen for a beacon, which would indicate that there is a network present. A beacon in the MoCA context is a signal transmitted by a particular MoCA network node, referred to as the network coordinator (NC). The system can be configured to listen for a predetermined time (e.g., for a few beacon cycles during a listening period), and can further be configured to do so for each MoCA channel, one at a time. For example, the system can be configured to listen throughout the search mode or at given times (e.g., beginning middle or end) of the search mode. The system may further be configured to listen for a short time that is long enough to detect a beacon preamble.

For example, consider the case of the MoCA network in which 50 beacons are sent over a 500 ms period. Sampling for approximately 100 μs at times spread out over the listening period enables the system to detect at least one beacon preamble over the 500 ms period. Examples of this are discussed in more detail below with reference to FIGS. 7 and 8.

If a network is detected, power is applied to system components and network operations are initiated. This is illustrated by operation 637, 652 and 654. In some embodiments, the entire communication device is powered up for operation, while embodiments, only those components necessary for communication across the detected network are powered unless and until other device operations are required. During operation, the communication device can be configured to determine whether operations have ceased and whether it should enter a sleep mode based on network communication requirements. If network communications are continuing, power is maintained and the device continues operate, illustrated by operation 656, and 658.

Once network operations have ceased, the system can be configured to return to the sleep mode by powering down system components as illustrated by operational flow line 659 and operation 642. At operation 642, the system can be configured to power down the system components used for network operations and either return to the search mode directly (not shown in FIG. 6), or wait for a predetermined period of time before returning to the search mode (operations 644, 646, and 648). In embodiments where the communication device returns to the search mode directly, power management module 208 (or power control module 212) can remain operational to determine whether a network is present while the remainder of the device is in sleep mode. In an embodiment where the device waits before returning to the search mode, the power management module can also return to the sleep mode (although it does not have to) as well as the remainder of the communication device. An example of this is illustrated by operations 644, 646, and 648 in which a timer is set and allowed to elapse before returning the communication device to the search mode.

If at operations 634 and 637 no network is detected, the system may be returned to a sleep state for a period of time and then again returned to the search mode to search for the presence of a network. This is illustrated by operations 642, 644, 646, and 648. In this manner, the device can be configured to toggled between a low-power mode and a search mode to search for the presence of a network.

Figure 7:
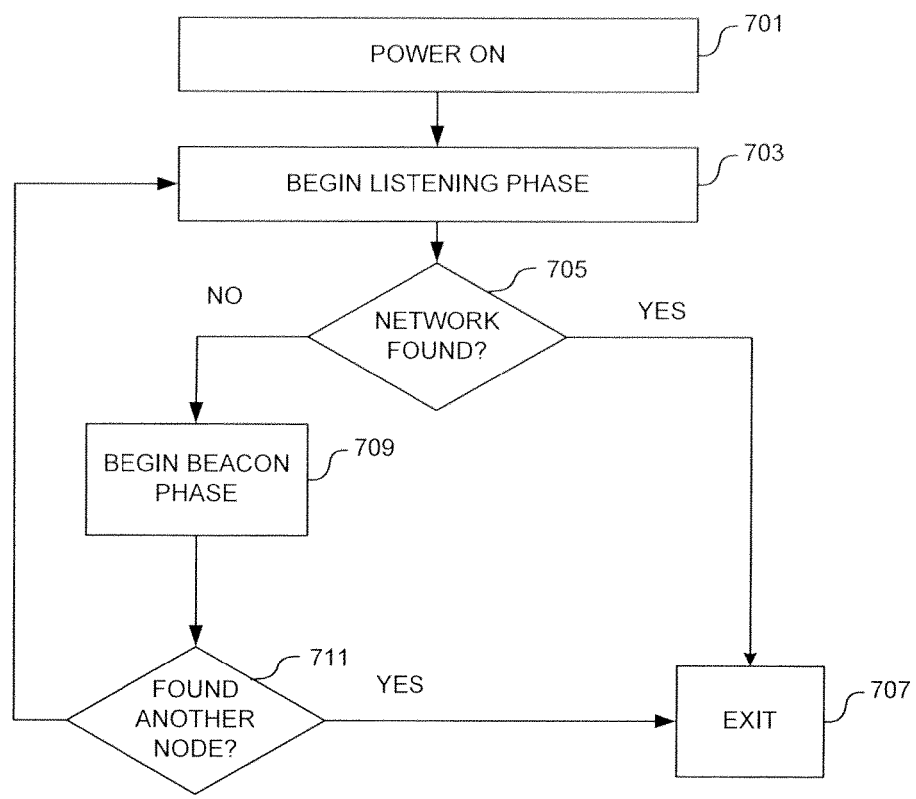
FIG. 7 is an operational flow diagram illustrating an example process for network formation in accordance with one embodiment of the technology disclosed herein.

In further embodiments of the systems and methods disclosed herein a communication device can be configured to form a new network with one or more other devices. FIG. 7 is an operational flow diagram illustrating an example process for network formation in accordance with one embodiment of the technology disclosed herein. In accordance with this example process, when the device is powered on it enters into a listening phase. This is illustrated by operation 701 and 703. The listening phase can be configured to last for a predetermined period of time, which preferably is enough time to search for and acquire a beacon. For example, in one embodiment, the listening phase can be configured to last for 40 seconds, although other time periods are possible.

During the listening phase, the communication device (e.g. network node 400) searches for and attempts to acquire a beacon. The node 400, for example, may begin the search on the last operating frequency (LOF) used by the node 400 to communicate over a network. The LOF is a channel defined by the network specification. Typically, as part of the network protocol, a network specification will define several channels over which nodes can communicate with one another e.g., determine the frequency and other characteristics associated with channel)* For example, a MoCA network is defined by the MoCA specification published by the Multimedia over Coax Alliance (MoCA). Several channels are defined by the MoCA specification for use by MoCA nodes. The particular group of channels that are used by a particular MoCA network may depend upon whether the coaxial cabling over which the MoCA nodes are communicating is also being used to distribute cable television content or satellite television content.

After initiating the search on the LOF, the node 400 steps through the channels available for that node 400 and communicates in accordance with the network protocol. In one embodiment of the disclosed technology, the node steps through the channels one at a time starting from the LOF. After searching the LOF, the node 400 searches the channel with the lowest frequency. The node 400 and then returns to search the LOF again. Next, the node 400 searches the next higher frequency. This pattern of bouncing from the LOF to the next higher channel continues until the channel with the highest frequency has been searched. At that point, the node 400 will continue the search pattern from the channel with the highest frequency to channel with the lowest frequency, searching the LOF in between each other channel. This search pattern will continue until the node has exhausted the 40 second listening phase or a network is found. This is illustrated by operation 705.

If node 400 finds another network (i.e., can acquire a beacon transmitted by a network coordinator (NC) of another network), then at operation 707, node 400 exits the network acquisition process. However, if the node 400 does not find another network, then node 400 begins a Beacon Phase (BP) as illustrated by operation 709. During the BP, node 400 transmits beacons over the network, as well as listens for beacons being transmitted by another node. If another node is present on the same channel, then that node will receive the beacon and respond, or node 400 hears beacons from the other node. In either case, node 400 will have found another node (operation 711). Alternatively, if node 400 cannot find another node on the same channel and no other node detects node 400 (operation 711), then the node 400 returns to operation 703 and once again starts a listening phase to search for a network (e.g., on all of the available channels in the network).

The duration of the listening phase can be selected to be any duration between the minimum and maximum duration allowed by the network specification. In accordance with one embodiment of the disclosed technology, the duration of the listening phase is determined randomly. That is, the listening time can vary from one cycle to the next so that it is not the same amount of time each cycle. The variations can be predetermined based on anticipated performance of the MAC parameters of the network. In one embodiment, the minimum duration is the amount of time required to search each channel at least once. The maximum duration may be determined as a trade-off between longer times for nodes to find one another if neither is yet part of a network and greater likelihood that a node will find a network that exists. That is, the more time a node remains in listening phase, the more likely it will be to find an existing network. However, the less time a node remains in listening phase, the more likely it will be to transmit a beacon to another node that is searching for an existing network. Using a random or a varying period of time for the listening phase listening phase provides a mechanism for offsetting the times when one node is transmitting beacons and another node is in listening mode.

Figure 8:
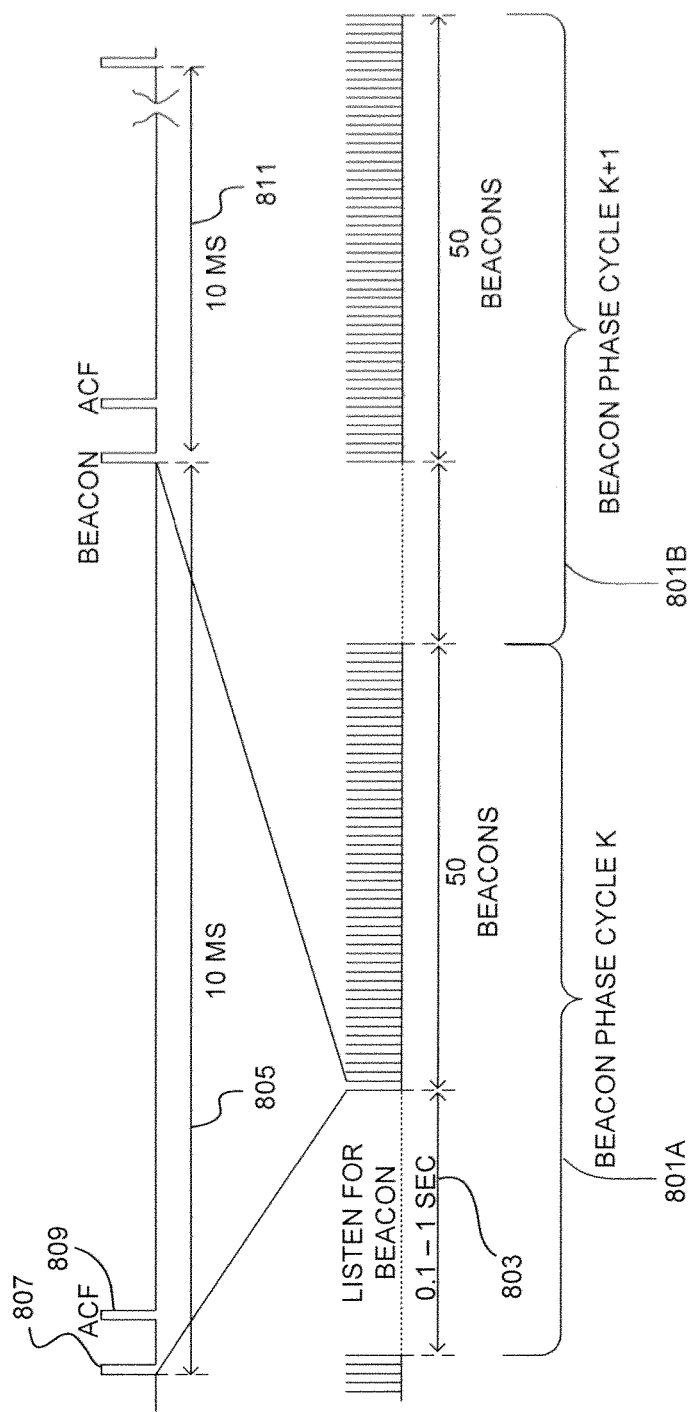
FIG. 8 is a diagram illustrating an example of the timing of a Beacon Phase performed by a network node during network acquisition in accordance with one embodiment of the technology disclosed herein.

Although this technique can be used for any of a number of different networks, an example in the context of one particular network can be useful to illustrate the timing. FIG. 8 is a diagram illustrating an example of the timing of a Beacon Phase (BP) performed by a network node 400 during network acquisition in accordance with one embodiment of the technology disclosed herein. The BP in this example comprises a random number of beacon phase cycles 801. FIG. 8 illustrates two such beacon phase cycles 801A, 801B. Each beacon phase cycle comprises a first listening period 803 during which node 400 listens to the LOF channel to detect any other nodes that might be active on the channel. In accordance with one embodiment of the disclosed technology, the listening period 803 has a duration that is variable between 0.1 seconds and 1 second. The particular duration of the listening period 803 is randomly determined within this range. This can vary from cycle to cycle according to a predetermined algorithm.

In one embodiment, node 400 listens during the entire listening period 803. Alternatively, node 400 only listens for a limited number of beacon cycles, each of which in this example embodiment is 10 milliseconds long. In accordance with one such embodiment, node 400 listens a second time for another limited number of beacon cycles if the listening period is greater than 0.5 second. The particular number of beacon cycles that the node listens over the duration of the listening period can vary depending on the implementation.

In addition to the listening period 803, each beacon phase cycle also comprises a plurality of beacon cycles 805. In one embodiment of the disclosed technology, listening period 803 is a time that the first of the beacon cycles 805 begins immediately after the end of the listening period 803. In one embodiment, there are 50 beacon cycles, each 10 milliseconds in duration. During each beacon cycle 805, a beacon 807 is transmitted followed by an admission control frame (ACF) 809. It should be noted that the scale of the timing diagram is not necessarily indicative of the duration of the beacon 807 and the ACF 809.

After 10 ms, a second beacon cycle 811 starts. The beacon phase cycle 801A ends when all beacon cycles concluded (50 in the illustrated example). During the ACF 809, node 400 listens to determine whether another node has heard the beacon that node 400 sent. If so, then node 400 has found another node (e.g., operation 711). Node 400 may then exit the process (e.g., operation 707).

In accordance with one embodiment of disclosed technology, the number of beacon phase cycles 801 is randomly selected from a range of N to M, where N is the minimum number of beacon phase cycles 801 and M is the maximum number of beacon phase cycles 801. In one embodiment, the minimum N is equal to 100. In some cases, the network specification may determine the value of the minimum. In one such embodiment, the maximum number M may be set to 200. Therefore, the number of beacon phase cycles 801 within one BP is randomly selected to be a value from 100-200.

In one embodiment, the value of M may be configured to depend upon the LOF of node 400. If the LOF of the node is near the channel at which node 400 begins to search, then the value of M can be reduced. However, if the LOF is further from the channel that node 400 begins searching, then the value of M is increased. It should be noted that the number of beacon phase cycles 801 is random, no matter what the values of N and M, but that the range of value from which the number is selected will vary with N and M.

By making the number of beacon phase cycles 801 random, nodes that have different LOFs and that power up at approximately the same time will find each other more rapidly, since the random number of beacon phase cycles 801 will change the timing of one node with respect to the other and put them out of synchronization with one another.

Figure 9:
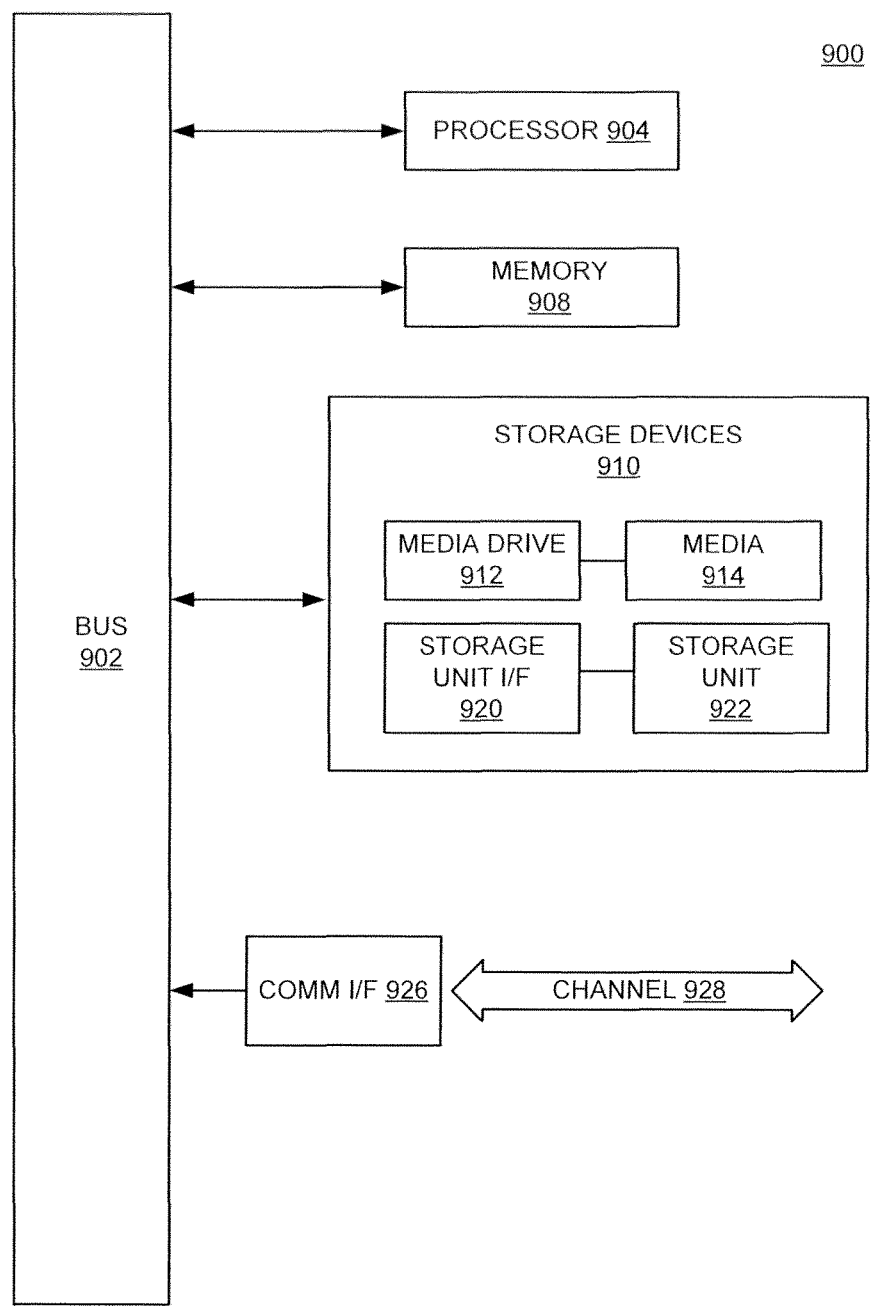
FIG. 9 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the technology using other computing modules or architectures.

Referring now to FIG. 9, computing module 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example. a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be exectued by processor 904. Computing module 900 might likewise include a read only memory ("ROM") or other static storage device coupled to bus 902 for storing static information and instructions for processor 904.

The computing module 900 night also include one or more various storage mechanism 910, which might include, for example, a media drive 912 and a storage unit interface 920. The media drive right include a drive or other mechanism to support fixed or removable storage media 914. For example, a hard disk drive, a floppy disk drive, a magnetic tape drive, an optical disk drive, a CD or DVD drive (R or RW), or other removable or fixed drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information mechanism 910 might include other similar instrumentalities for allowing computer) s or other instructions or data to be loaded into computing module 900. Such instrumentalities might include, for example, a fixed or removable storage unit 922 and an interface 920. Examples of such storage units 922 and interlaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900. Computing module 900 might also include a communications interface 924.

Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth(R interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, main memory 908, storage unit 920, storage media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, Which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "hut not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A communication device comprising:
   at least one module operable to, at least:
   select a number of beacon phase cycles, between a minimum number of beacon phase cycles and a maximum number of beacon phase cycles, to perform in a beacon phase;
   operate in a listening phase in which the at least one module, at least, searches for a beacon on a plurality of channels of the network; and
   if no beacon is heard during the listening phase, then operate in the beacon phase in which the at least one module, at least, transmits beacons over the network and listens for a transmission on the network by another communication device, wherein the beacon phase comprises the selected number of beacon phase cycles.

2. The communication device of claim 1, wherein the at least one module is operable to listen for a transmission on the network by another communication device by, at least in part, operating to:
   listen for a response to beacons transmitted by the communication device; and
   listen for beacons transmitted over the network.

3. The communication device of claim 1, wherein the at least one module is operable to select a second number of beacon phase cycles, different from the selected number of beacon cycles, during a single network forming procedure.

4. The communication device of claim 1, wherein the at least one module is operable to select the number of beacon phase cycles randomly.

5. The communication device of claim 1, wherein the at least one module is operable to determine the maximum number of beacon phase cycles based, at least in part, on a last operating frequency of the communication device.

6. The communication device of claim 1, wherein the at least one module is operable to:
select a duration of the listening phase; and
operate in the listening phase for the selected duration of the listening phase.

7. The communication device of claim 6, wherein the at least one module is operable to select the duration of the listening phase randomly.

8. The communication device of claim 1, wherein the at least one module is operable to:
select a listening phase duration between a minimum listening phase duration and a maximum listening phase duration; and
operate in the listening phase for the selected listening phase duration.

9. The communication device of claim 8, wherein the at least one module is operable to listen for a transmission on the network by another communication device by, at least in part, operating to:
listen for a response to beacons transmitted by the communication device; and
listen for beacons transmitted over the network.

10. The communication device of claim 8, wherein the at least one module is operable to select a second listening phase duration, different from the listening phase duration, during a single network forming procedure.

11. The communication device of claim 8, wherein the at least one module is operable to select the listening phase duration randomly.

12. The communication device of claim 8, wherein the minimum listening phase duration is an amount of time required to search each channel of the plurality of channels at least once.

13. The communication device of claim 8, wherein the at least one module is operable to select the number of beacon phase cycles based at least in part on frequency.

14. The communication device of claim 8, wherein the at least one module is operable to determine the maximum number of beacon phase cycles based, at least in part, on a last operating frequency of the communication device.

15. The communication device of claim 8, wherein the at least one module is operable to randomly select the number of beacon phase cycles to perform in the beacon phase.

* * * * *